US010995591B2

(12) United States Patent
Horgen

(10) Patent No.: US 10,995,591 B2
(45) Date of Patent: May 4, 2021

(54) METHOD FOR INSTALLING A HATCH TO A SUBSEA STRUCTURE, HINGE AND ASSEMBLY FOR SUBSEA USE

(71) Applicant: FMC Kongsberg Subsea AS, Kongsberg (NO)

(72) Inventor: Bjørn Martin Horgen, Hokksund (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 253 days.

(21) Appl. No.: 16/098,842

(22) PCT Filed: May 2, 2017

(86) PCT No.: PCT/EP2017/060370
§ 371 (c)(1),
(2) Date: Nov. 2, 2018

(87) PCT Pub. No.: WO2017/191106
PCT Pub. Date: Nov. 9, 2017

(65) Prior Publication Data
US 2019/0145229 A1    May 16, 2019

(30) Foreign Application Priority Data

May 2, 2016 (NO) .............................. NO20160733

(51) Int. Cl.
*E21B 41/08* (2006.01)
*E21B 33/037* (2006.01)
(Continued)

(52) U.S. Cl.
CPC ............... *E21B 41/08* (2013.01); *E04C 2/42* (2013.01); *E04F 19/10* (2013.01); *E05D 1/02* (2013.01);
(Continued)

(58) Field of Classification Search
None
See application file for complete search history.

(56) References Cited

U.S. PATENT DOCUMENTS

| 4,574,425 A | 3/1986 | Sugiura |
| 4,670,938 A | 6/1987 | Fowlston |
| 2015/0184401 A1* | 7/2015 | Steck ........................ E05D 1/02 |
| | | 182/222 |
| 2019/0145229 A1* | 5/2019 | Horgen ..................... E04C 2/42 |
| | | 166/351 |

FOREIGN PATENT DOCUMENTS

| DE | 1 238 977 B | 4/1967 |
| DE | 1964115 U | 4/1967 |

(Continued)

OTHER PUBLICATIONS

GFP Engineering Ltd., GRP Grating and Flooring Systems (Mar. 12, 2016) (retrieved from the internet on Jul. 17, 2017 from URL: http://www.gfpengineering.co.uk/grp-fabricated-products/grp-grating.asp).

*Primary Examiner* — Matthew R Buck
*Assistant Examiner* — Douglas S Wood

(57) ABSTRACT

The invention concerns a method for installing a hatch (34) to a subsea structure (10) by connecting the hatch to the subsea structure by at least one hinge (20) having a first mounting portion (21), a second mounting portion (22), a flexible portion (23) interconnecting the first and second mounting portion allowing a pivot connection between the first and second mounting portion. The installation steps comprise •—inserting a protrusion (23) of the first mounting portion (21) into an installation hole arranged in the subsea structure (10), •—inserting a protrusion (24) of the second mounting portion (22) into an installation hole arranged in the hatch (34), thereby •—engaging the first mounting portion (21) of the hinge (20) for anchorage with the subsea structure (10) and engaging the second mounting portion (22) for anchorage with the hatch (34) thereby arranging for the hatch to pivot between a closed and an open position (Continued)

about a pivot axis provided by the flexible portion of the hinge. The invention also concerns a hinge and an assembly for subsea use.

14 Claims, 4 Drawing Sheets

(51) Int. Cl.
*E05D 1/02* (2006.01)
*E04C 2/42* (2006.01)
*E04F 19/10* (2006.01)
*E05D 7/12* (2006.01)
*F16S 3/08* (2006.01)

(52) U.S. Cl.
CPC .............. *E21B 33/037* (2013.01); *E05D 7/12* (2013.01); *F16S 3/08* (2013.01)

(56) References Cited

FOREIGN PATENT DOCUMENTS

| | | |
|---|---|---|
| DE | 2 253 809 A1 | 5/1974 |
| DE | 40 31 665 A1 | 4/1992 |
| FR | 2 885 934 A1 | 11/2006 |
| FR | 2 951 234 A1 | 4/2011 |
| GB | 994528 A | 6/1965 |
| GB | 1007683 A | 10/1965 |
| GB | 1022636 A | 3/1966 |
| GB | 2 099 910 A | 12/1982 |
| GB | 2 162 576 A | 2/1986 |
| GB | 2461571 A | 1/2010 |
| JP | H06307149 A | 4/1993 |
| WO | WO 2010/115712 A2 | 10/2010 |
| WO | WO 2012/095485 A2 | 7/2012 |

* cited by examiner

METHOD FOR INSTALLING A HATCH TO A SUBSEA STRUCTURE, HINGE AND ASSEMBLY FOR SUBSEA USE

TECHNICAL FIELD

The invention concerns a method for installing a hatch to a subsea structure, a hinge for subsea use arranged to be connected to a hatch and to a subsea structure and an assembly for subsea use comprising a hinge connecting the hatch to the subsea structure.

The invention is suitable for installation a hatch to a subsea structure such as a protective structure, but also to other subsea structures where a hatch need to be installed.

Protective structures are installed to provide protection for subsea equipment such as well heads, christmas trees and manifolds etc. In some waters for instance the shallow waters of the North Sea regulations require that the subsea structures are provided to withstand impact from dropped objects and are also to be made overtrawlable.

In accordance with these requirements the overtrawlable structures should have a design allowing fishing equipment to travel over the subsea structures without getting tangled in the protective structure.

BACKGROUND

For access to the inside of these subsea structures hatches are normally provided in the roof or in a side portion of subsea structures.

The roof of the subsea structures may be made of a metallic material such as steel, of a composite such as a polymer composite or a combination of metal and composite. The hatch may be made in a light weight material such as Glass Fibre Reinforced Polymer (GRP).

In accordance with prior art solutions a metallic hinge such as a steel hinge has customary been used for connecting the hatches to the roof of the subsea structures. The steel hinges are welded to the roof of the subsea structures which also may be made in a metallic material (for instance steel) and cathodic protection thus needs to be provided. Hinges made in Glass Fibre Reinforced Polymer (GRP) have been suggested as an alternative to steel hinges. However with this suggested solution the GPR hinges need to be bolted to the hatch with bolts fabricated in a corrosion resistant material.

Currently a demand has evoked for subsea structures being provided in light weight material to reduce the weight of the subsea structures. Parts of or the whole of the subsea structures is made in a light weight material. The hatch may also be provided in a light weight material and this opens up the possibility for providing the hinge with a lower structural strength than the conventionally made hinge which is made to carry the weight of heavier material.

Various publications describe hinges made in another material than metal: DE4031665 shows a hinge with two attachment portions provided with pins to be pressed into holes of door panels making up a folding door. The hinge has a flexible portion connecting the two attachment portions and when mounted to the door panels, the flexible portion allows for articulated movement to take place when folding or unfolding the door.

The following documents show various examples of hinges made in a polymer material and having two attachment portions interconnected with a flexible member to obtain a pivoting movement when connected to structural elements: GB2162576 DE1238977 DE1964115 FR2885934, FR2951234, U.S. Pat. Nos. 4,670,938, 4,574,425, JPH06307149, GB1022636 and GB1007683.

Within the subsea field, there is a today need for providing cost reducing solutions and thus an incentive to develop optimized and simplified solutions while at the same time satisfying the overall requirements for the aforementioned subsea use.

The object of the invention is to provide a solution that has low weight and low manufacturing costs. A further object of the invention is to provide a versatile solution that is easily applicable for use with various kind of subsea structures. The avoidance of costly arrangements to avoid corrosion has also incurred the development of the current solution.

SUMMARY OF THE INVENTION

The invention is set forth and characterized in the main claim, while the dependent claims describe other characteristics of the invention.

The invention concerns a method for installing a hatch to a subsea structure by connecting the hatch to the subsea structure by a at least one hinge. The hinge, which may be manufactured as a one piece hinge, has a first mounting portion, a second mounting portion and a flexible portion interconnecting the first and second mounting portion. The flexible portion allows for a pivot connection between the first and second mounting portion. The installation steps comprise inserting a protrusion of the first mounting portion into an installation hole arranged in the subsea structure, inserting a protrusion of the second mounting portion into an installation hole arranged in the hatch, thereby engaging the first mounting portion of the hinge for anchorage with the subsea structure and engaging the second mounting portion for anchorage with the hatch thereby arranging for the hatch to pivot between a closed and an open position about a pivot axis provided by the flexible portion of the hinge.

Further the invention also concerns a hinge for subsea use, which may be arranged as a one piece hinge, to be connected to a hatch and to a subsea structure. The hinge comprises a first mounting portion, a second mounting portion and a flexible portion interconnecting the first and second mounting portion. The flexible portion allows for pivoting movement between the first and second mounting portion about a pivot axis provided in the flexible portion. A protrusion of the first mounting portion is arranged to be accommodated in an installation hole of the subsea structure for anchorage to the subsea structure.

A protrusion of the second mounting portion is arranged to be accommodated in an installation hole of the hatch for anchorage to the hatch, and when the hinge is connected to the hatch and the subsea structure a pivotally arranged connection is established for the hatch to pivot between a closed and an open position about the pivot axis arranged in the flexible portion of the hinge.

Further the invention also concerns an assembly for subsea use comprising a hatch connected to the subsea structure by the inventive hinge as defined above, wherein the installation holes are arranged extending through the hatch and/or the installation hole(s) of the subsea structure extend through the subsea structure and the protrusions are accommodated in the respective installation holes for anchorage of the hinge to the hatch and the subsea structure. The installation holes may be arranged extending through the thickness/depth portion of the hatch and/or the installation holes may be extending through the thickness/depth portion of the subsea structure.

The proposed hinge is a replacement of the conventionally used hinges which needs to be attached by bolts, welding etc. The proposed hinge does not comprise moveable part and has the advantage that it may be manufactured in a relatively soft and pliant material such as for instance a polymer material, preferably polyurethane (PUR). The proposed hinged and method for installing may be employed for installing at least one hinge of the hatch or all hinges of the hatch. Of course, the number of hinges necessary for installing a hinge to a subsea structure may vary. In some circumstances one hinge may be enough for installing a hatch, in other circumstances plural hinges may be required.

The flexible portion of the proposed hinge provides an alternative solution to the hinge being made up of movable parts to conduct the hinge movement. In order for the flexible part to allow for the first and second portions to be moved by a pivot movement or hinged movement relative each other, the flexible portion may be configured for pivoting to occur about a pivot axis within the flexible portion. The flexible portion may for instance be made with a thickness dimension to allow folding or pivoting about the pivot axis and/or the flexible portion may have material characteristics providing for elastic deformation to occur about the pivot axis. As the skilled person understands the flexible portion may be provided in various ways, and could in some instances be provided of a material different from the material of the mounting portion or as a part separate from the mounting portions. The main purpose of the flexible part is the capability of arranging a pivot connection when attached to the hatch and the subsea structure.

The hinge may also be attached to other objects for subsea use than a hatch and a subsea structure such as for instance plate structures or other members where it is desirable to provide a possibility for making a pivot connection between the objects in order to conduct a hinged movement.

It would be advantageous but not mandatory, that the hinge is made as one piece hinge manufactured in the same material throughout the hinge. The various portions of the hinge may be produced with different shore hardness, and the strength of the various portions may vary according to the function of the designated portion. Consequently, the flexible portion may have a material strength capable of enduring the pivoting movement when connected to the hatch/the subsea structure.

Further it would also be advantageous that some parts of the protrusions are prepared with a material having characteristics allowing for some elastic deformation such as compression to take place when inserting the protrusions in the installation holes. At the same time the mounting portions also need to be provided with a certain strength to withstand the forces when engaged to the hatch/subsea structure and the forces resulting from the pivoting movement.

The protrusion of the first mounting portion may comprise an insert portion with a first diameter and an abutment portion for anchoring the hinge to the subsea structure. At least a portion of the circumference of the abutment portion may have a second diameter that is larger than the first diameter. The insert portion may correspond to the depth of the installation hole of the subsea structure wherein it is to be accommodated. Further, the abutment portion may be arranged at the end of the insert portion for engagement with the subsea structure to anchor the first mounting portion to the subsea structure.

The protrusion of the second mounting portion may comprise an insert portion with a first diameter and an abutment portion for anchoring the hinge to the hatch. At least a portion of the circumference of the abutment portion may have a second diameter that is larger than the first diameter. The insert portion may correspond to the depth of the installation hole of the hatch wherein it is to be accommodated. Further, the abutment portion may be arranged at the end of the insert portion for engagement with the hatch to anchor the second mounting portion to the hatch.

Both protrusions may be provided with an insert portion and an abutment portion for engagement with the hatch/subsea structure, or one protrusion may have this configuration while the other one has an alternative configuration, or both protrusions may have the alternative configuration. The alternative configuration may be provided in various ways as long as the protrusions are arranged for accommodation in the installation holes for anchorage to the hatch/protective structure. The various configuration of the protrusions may be made with a square, circular, inverted or twisted shape. The anchorage to the hatch/protective structure may as an alternative to the abutment portion as mentioned above be configured so that the protrusion is anchored to the inner walls of the installation hole. As a further alternative the engagement portions providing anchorage for the protrusion could also be arranged in installation holes or in the hatch/protective structure. These engagement portions would interact with the protrusions to anchor the hinge to the hatch/protective structure. In another alternative an additional anchoring element such as a plug may be used for connection of the protrusions to the hatch/subsea structure.

Further, it would also be advantageous that some parts of the mounting portions are prepared with material having characteristics allowing for elastic deformation. For instance, the abutment portion of the protrusion may be elastic deformable in order to facilitate the insert of the protrusion through the installation hole to bring the abutment portion into engagement with the subsea structure/hatch. However, the abutment portion also needs to display a certain structural strength in order to maintain the anchorage with the subsea structure/hatch into the installation hole, thus the need for inserting the protrusion through the insert hole needs to be balanced with the structural strength necessary to the abutment portion.

When manufacturing the hinge in a polymer material such as polyuretan an acceptable wear resistance is ensured and there is no need for additional corrosion protection. In addition the manufacture cost are relatively low, especially when made in batches by molding.

One embodiment of the method may comprise providing the hatch and/or the subsea structure in a light weight material, preferably Glass Fibre Reinforced Polymer (GRP). The hatch and/or the subsea structure may also be provided in another metallic material as long as the material is suitable for providing installation holes in the material. As the hinge is attached to the hatch/subsea structure by the use of installation holes, the need for providing the material compatible with the material of the hinge such as when welding, is superfluous.

The number of installation holes may vary according to the need of the specific use of the invention. For some purposes it may be advantageous to prearrange the number of holes necessary for the installation of the hatch. In other circumstances it may be more convenient arranging the subsea structure and/or arranging the hatch with a set of installation holes. This provides the opportunity of optionally selecting the installation hole(s) within the set of the installation according to need for inserting the protrusions. It is of course possible to provide the hatch with a set of installation holes while the installation holes in the subsea structure is prearranged, or the other way around.

One embodiment of the invention suggests the solution of providing at least a portion of the subsea structure and/or at least a portion of the hatch with a grated configuration with grate openings. This solution provides the option of selecting one or more of the grate openings as the installation hole(s). Both the hatch and the subsea structure may be provided with grated configuration or one of the hatch and the subsea structure may be provided with grated configuration. In accordance with this embodiment it is possible to provide the hatch and/or the subsea structure in a metallic material with an integrated portion with a grated configuration which may be made in a light weight material, for instance Glass Fibre Reinforced Polymer (GRP).

Usually the hatch will be manufactured separate from the subsea structure, but in some cases the hatch may be made by cutting the hatch out from the subsea structure. In accordance with one aspect both the subsea structure such as a protective cover and the hatch may be provided with a grated configuration and the hatch may be made by cutting the hatch out from and the subsea structure (protective cover). This procedure for the making of the hatch may be planned beforehand or it may be conducted if the need suddenly arises. When making the hatch the outline of the hatch may be conducted by initially cutting the outline of the hatch in the subsea structure for instance the protective cover for the making the hatch. With the hatch cut out from the subsea structure, procedure will further follow the main steps of the installation procedure as described above, by employing the grate openings of the hatch and the remaining subsea structure as inserting holes. The hatch in the closed position may be arranged positioned at level with the remaining subsea structure thereby making a hatch solution that is integrated with the subsea structure. To bring the hatch into open position the hatch is pivoted away from the levelled position and may be folded in a position on top of the subsea structure.

As mentioned above, one possibility when manufacturing the installation holes is providing prearranged or premade installation holes in the subsea structure and/or the hatch. Another possibility is to provide the installation holes according to need, and it is of course also possible to combine these methods; that is, making some of the installation holes before hand and the adding installation holes as the need presents itself. If a need for installation of a hatch arises without being preplanned, the installation holes may easily be provided in the subsea structure and the hatch installed. As such, the inventive solution renders conducting on site manufacturing of the installation holes in the subsea structure and/or the hatch possible. The installation holes may be manufactured during installation of the hatch/subsea structure for instance on the installation vessel or at the installation subsea.

BRIEF DESCRIPTION OF THE DRAWINGS

These and other characteristics of the invention will be clear from the following description of a preferential form of embodiment, given as a non-restrictive example, with reference to the attached drawings wherein.

FIG. 1 is an illustration of an example of a subsea structure 10 arranged as a protective structure. The shown subsea structure 10 comprises a frame structure 11 and protective cover 12 here arranged as a roof structure. The subsea structure 10 as shown in FIG. 1 is arranged as a secondary roof on top of a manifold roof 2. The pipes 13 of the manifold is illustrated beneath the manifold roof 2. In accordance with prior art a hatch 14 is connected to the subsea structure 10 by conventional hinges 15.

FIG. 2 shows the conventional hinges 15 in a closer detail. These hinges 15 are usually made from steel and are welded to the subsea structure 10 which also is made from steel. The hatches 14 may be made of Glass Fibre Reinforced Polymer (GRP) but the presence of a steel hinge makes a cathodic protection arrangement mandatory in order to avoid corrosion.

In FIG. 3 a hinge 20 is proposed. The hinge has a first mounting portion 21, a second mounting portion 22 and a flexible portion 123 interconnecting the first and second mounting portions 21, 22. In accordance with the embodiment shown in FIG. 3 both mounting portions 21, 22 have protrusions 23, 24 each projecting from the first and second mounting portions. The protrusions 23, 24 each have an insert portion 25, 26 terminating in an abutment portion 27, 28.

FIGS. 3 and 4 show the installation of the hinge 20 to provide a pivot connection between a hatch 34 and a subsea structure 10 here shown as subsea structure with a grated configuration with grate openings. The protrusion 23 of the first mounting portion 21 is accommodated in an installation hole provided by one of the grate openings of the subsea structure 10 and anchored to the subsea structure. The protrusion 23 of the second mounting portion 22 is arranged accommodated in an installation hole of the hatch and anchored to the hatch. The hinge 20 is shown in the figures with identical mounting portions 21, 22. The hinge may of course also be arranged with mounting portions that differ from one another and where each mounting portion is provided suitable to fit with a corresponding installation hole.

Figure 1:
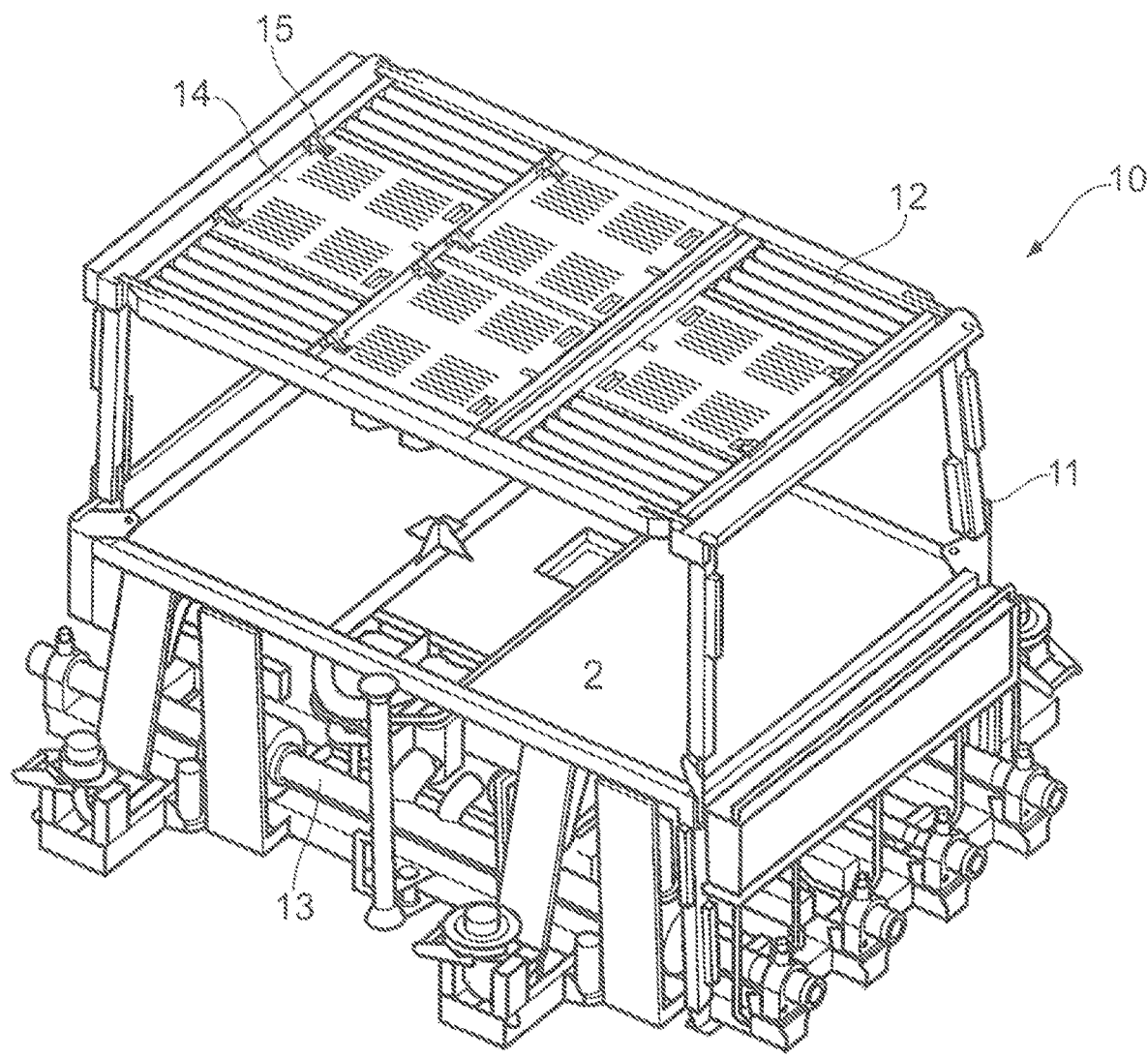
FIG. 1 shows a typical example of a subsea structure arranged with a hatch.
Figure 2:
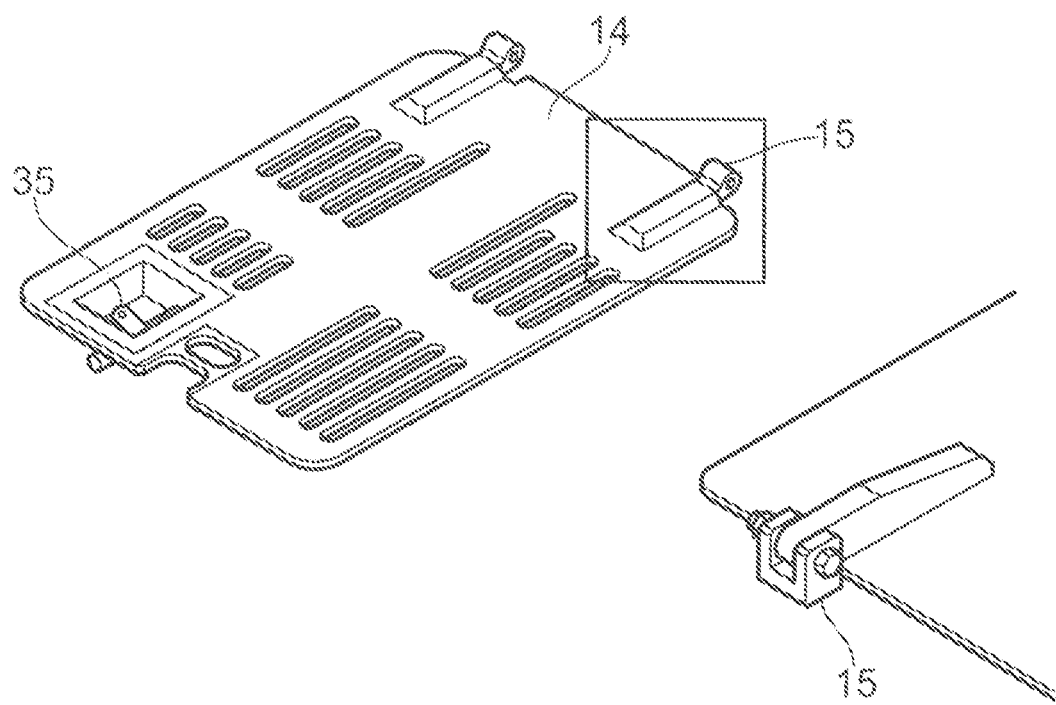
FIG. 2 shows a prior art hinge for connection of a hatch to a subsea structure.
Figure 3:
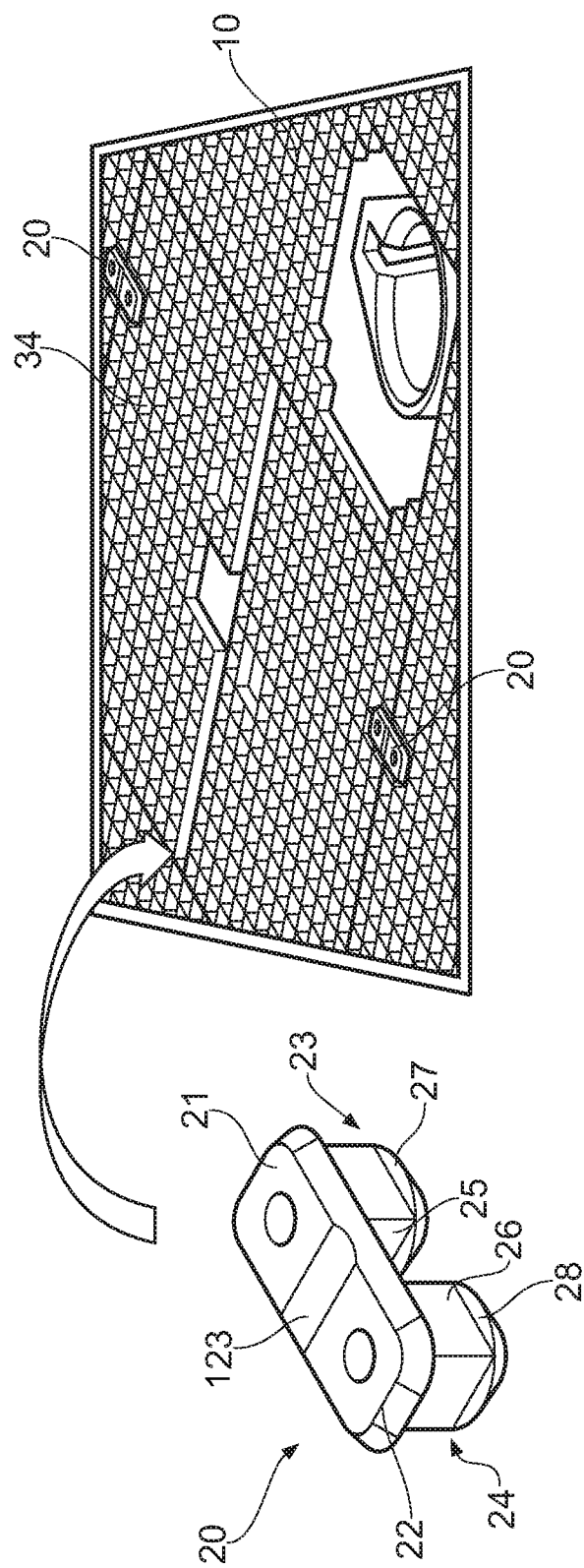
FIG. 3 shows a new solution for a hinge and an example of installation of a hatch by use of the hinge.

The hinge 20 may be provided in a polymer material, preferably polyurethane (PUR) or in any other non-metallic material which is suitable for shaping for instance by moulding into the proposed solution as shown by example in FIG. 3. By using the proposed solution of the hinge a contributory effect is that it is possible to simplify the conventionally shaped hatch as shown in FIG. 2.

The hatch 14 in FIG. 2 may be arranged with a recess or installation hole 35 with a shape fitted for attaching the mounting portions 21 into the recess as a replacement of the prior art hinges 15 as shown in FIG. 2.

In FIG. 3 the subsea structure 10 and the hatch is shown with a grated configuration and the shown hatch 34 may be provided by as a separate premade hatch or by simply cutting the hatch out from the subsea structure thereby making an integrated hatch in the subsea structure 10 as shown. The hinges 20 are easily installed by fitting the protrusions 23, 24 into accommodated positions in the grate openings for anchorage to the subsea structure or the hatch. When the hinge is connected to the hatch and to the subsea structure a pivotally arranged connection is thereby established for the hatch to pivot between a closed and an open position.

When installing the hinge 20 to a subsea structure as shown in FIG. 3, it is not mandatory that the installation position for the hatch is planned beforehand. As the hatch 14 may be cut out from the subsea structure and the hinge 20 installed in any of the grated openings, the solution provides for a versatile solution where the hatch position may thus be chosen according to need at the time.

Also when other subsea structures than those with grated configuration are employed, the solution facilitates an easy installation of the hatch as installation holes may be machined where needed, and the hatch installed subsequently by inserting the protrusions in the installation holes for anchorage. As such the use of the hinge inserted into installation holes makes is possible to choose an installation position and install a hatch when the need arises either at the installation site or during preparation for installation.

When installing the hinges at the chosen position one of the protrusions 23, 24 is inserted into the installation hole of the hatch and the other into the subsea structure. The shown insert portions 25, 26 of the protrusions 23, 24 each has a length corresponding to the depth of the installation holes and in the accommodated position, positioning the abutment portion 27, 28 in an engagement position with the subsea structure or the hatch.

The illustrated configuration of the hinge is one example of form fitting the hinge into the installation holes for anchorage to the subsea structure and the hatch. Depending on the installation hole and the hatch to be used, the protrusions of the hinge may be shaped according to the installation hole. Consequently, various configurations other than the one exemplified in the figures may be chosen for providing anchorage in the installation hole.

Figure 4:
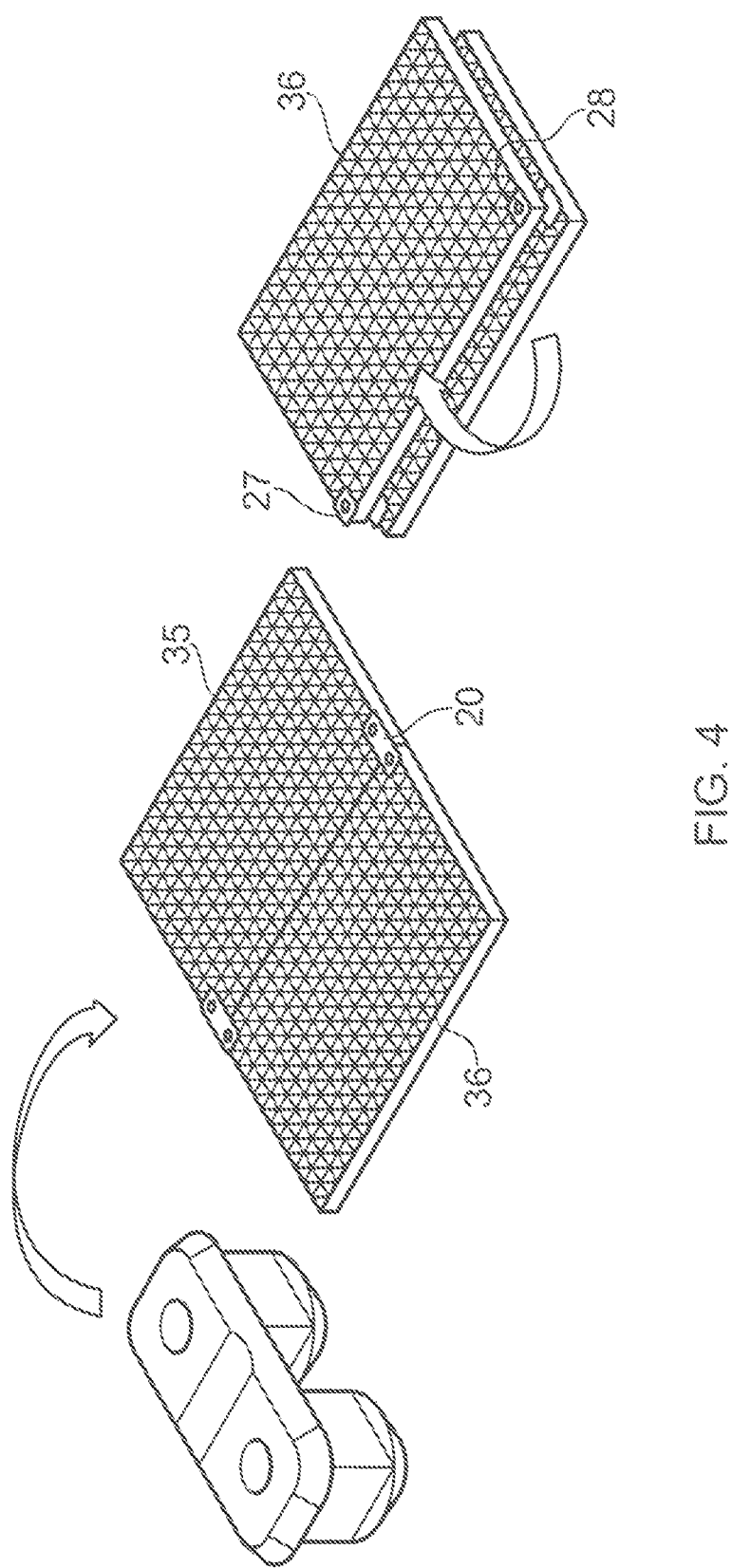
FIG. 4 shows the hinge installed to connect a hatch to the subsea structure.

FIG. 4 shows the protrusions of the hinge 20 installed in the grate openings of two separate plate structures 35, 36 to make a pivot connection between these plate structures. One of the plate structures may be a hatch and the other a subsea structure or a protective cover. The plate structures 35, 36 are shown in an unfolded position to the left in FIG. 4 and in a folded position to the right in FIG. 4. In the folded position to the right, the engagement between the abutment portions 27, 28 and the side of the plate structure from where the hinge is inserted is illustrated.

The invention claimed is:

1. A method for installing a hatch to a protective subsea structure comprising:
providing at least one hinge having a first mounting portion, a second mounting portion and a flexible portion interconnecting the first and second mounting portions, the flexible portion providing a pivot connection between the first and second mounting portions;
inserting a first protrusion of the first mounting portion into a first installation hole arranged in the subsea structure, the first protrusion comprising a first insert portion which is configured to be received in the first installation hole and a first abutment portion located at a distal end of the first insert portion which is configured to be inserted through the first installation hole and then expand into engagement with the subsea structure to thereby anchor the first mounting portion to the subsea structure;
inserting a second protrusion of the second mounting portion into a second installation hole arranged in the hatch, the second protrusion comprising a second insert portion which is configured to be received in the second installation hole and a second abutment portion located at a distal end of the second insert portion which is configured to be inserted through the second installation hole and then expand into engagement with the hatch to thereby anchor the second mounting portion to the hatch;
engaging the first mounting portion of the hinge for anchorage with the subsea structure and engaging the second mounting portion of the hinge for anchorage with the hatch, thereby arranging for the hatch to pivot between a closed position and an open position about a pivot axis provided by the flexible portion of the hinge.

2. The method for installing a hatch to a subsea structure in accordance with claim 1, wherein the hinge is made of a polymer material.

3. The method for installing a hatch to a subsea structure in accordance with claim 2, wherein the hinge is made of polyurethane (PUR).

4. The method for installing a hatch to a subsea structure in accordance with claim 1, wherein the hinge is manufactured as a one piece hinge.

5. The method for installing a hatch to a subsea structure in accordance with claim 1, further comprising providing the hatch and/or the subsea structure in in one of a Glass Fibre Reinforced Polymer (GRP).

6. The method for installing a hatch to a subsea structure in accordance with claim 1, further comprising arranging at least one of the subsea structure and the hatch with a set of installation holes and selecting at least a designated installation hole within the set of installation holes.

7. The method for installing a hatch to a subsea structure in accordance with claim 1, further comprising:
providing at least one of the subsea structure and the hatch with at least a portion of a grated configuration having a plurality of grate openings; and
selecting at least one of the grate openings as a corresponding one of the installation holes.

8. The method for installing a hatch to a subsea structure in accordance with claim 1, further comprising manufacturing the installation holes during installation of the hatch/subsea structure.

9. The method for installing a hatch to a subsea structure in accordance with claim 1, further comprising:
providing at least a portion of the subsea structure with a grated configuration having a plurality of grate openings and cutting the outline of the hatch in the subsea structure to make the hatch; and then
employing a number of the grate openings of the hatch and the remaining subsea structure as installation holes;
whereby the hatch is positioned at a level with the remaining subsea structure when the hatch is closed and is pivoted away from the level position when the hatch is open.

10. A hinge for subsea use arranged to be connected to a hatch and to a subsea structure, the hinge comprising:
a first mounting portion, a second mounting portion, and a flexible portion interconnecting the first and second mounting portions to allow for pivoting movement between the first and second mounting portion about a pivot axis provided in the flexible portion;
the first mounting portion comprising a first protrusion arranged to be accommodated in an installation hole of the subsea structure for anchorage to the subsea structure;
the second mounting structure comprising a second protrusion arranged to be accommodated in an installation hole of the hatch for anchorage to the hatch, such that when the hinge is connected to the hatch and the subsea structure a pivot connection is established for the hatch which allows the hatch to pivot between a closed position and an open position about a pivot axis arranged in the flexible portion of the hinge;

wherein the first protrusion has a first insert portion and a first abutment portion located at a distal end of the first insert portion, the first abutment portion being configured to be inserted through the installation hole in the subsea structure and then expand into engagement with the subsea structure to thereby anchor the first mounting portion to the subsea structure;

wherein the second protrusion has a second insert portion and a second abutment portion located at a distal end of the second insert portion, the second abutment portion being configured to be inserted through the installation hole in the hatch and then expand into engagement with the hatch to thereby anchor the first mounting portion to the hatch; and wherein the hinge is made of a polymer material.

11. An assembly for subsea use comprising a hatch, a subsea structure and a hinge in accordance with claim 10, wherein the hinge connects the hatch to the subsea structure, and wherein the installation hole(s) of the hatch extend through the hatch and/or the installation hole(s) of the subsea structure extend through the subsea structure, and wherein the first and second protrusions are accommodated in the respective installation holes for anchorage of the hinge to the hatch and to the subsea structure.

12. The assembly in accordance with claim 11, wherein the hatch and/or the subsea structure is made of Glass Fibre Reinforced Polymer (GRP).

13. The assembly in accordance with claim 11, wherein at least a portion of the subsea structure or at least a portion of the hatch has a grated configuration with a plurality of grate openings, and wherein at least one of the installation holes is formed by one of the grate openings.

14. The hinge of claim 10, wherein the hinge is made of polyurethane (PUR).

* * * * *